United States Patent Office 3,579,589
Patented May 18, 1971

3,579,589
PROCESS FOR MANUFACTURING A CATALYST, RESULTING CATALYST AND PROCESS FOR MANUFACTURE OF BENZOIC ALDEHYDE FROM TOLUENE IN THE PRESENCE OF SAID CATALYST
Bernard Delmon, Seyssins, France, assignor to Institut Francais du Petrole des Carburants et Lubrifiants, Rueil Malmaison, France
No Drawing. Filed Sept. 5, 1968, Ser. No. 757,755
Claims priority, application France, Sept. 13, 1967, 120,933
Int. Cl. C07c 47/48, 47/52
U.S. Cl. 260—599    19 Claims

ABSTRACT OF THE DISCLOSURE

Process for manufacturing a catalyst used for oxidizing toluene to benzaldehyde, which process comprises admixing an uranium oxide or salt with a molybdenum oxide or salt in the presence of sulfuric acid, drying and calcinating the resulting mixture.

Optionally, there can be added to the mixture, before drying and calcinating, an alkaline or alkaline-earth metal compound and/or metals or compounds of metals such as chromium, tungsten, silver, copper, yttrium, cerium and other elements from the group of the rare earths.

---

The present invention relates to the preparation of a catalyst which is used for manufacturing benzoic aldehyde from toluene with a good yield; the conversion of toluene to benzoic aldehyde being carried out by partial oxidation with air or a gaseous mixture containing molecular oxygen.

Benzoic aldehyde is usually manufactured from toluene. The most generally used method consists of causing chlorine to react with toluene and of hydrolysing the resulting dichlorinated product. This process results in the formation of numerous by-products and the yield in benzoic aldehyde is about 80%. Moreover, it has the disadvantage of being very costly, due to the use of chlorine.

Accordingly another method has been proposed, consisting in the direct oxidation of toluene to benzaldehyde. This method offers the advantage of using as gaseous reactant, instead of chlorine, a very cheap gas, i.e., oxygen, air or an oxygen-containing mixture. The oxidation requires the use of a solid catalyst. However, up to now, it has been impossible to carry out selectively the oxidation of toluene to benzaldehyde under advantageous conditions, due to the formation in substantial amounts of byproducts and the destructive oxidation of a part of the reactant.

It is usual to define as conversion rate or conversion rate by run the proportion of the reactant, the toluene in the present case, which is converted at each passage over the catalyst either into the desired product, benzoic aldehyde in the present case, or into byproducts; by yield per run there is meant the proportion of reactant converted in each run to the desired product; and finally by selectivity there is meant the ratio of the amount of reactant converted to the desired product to the total amount of convered reactant. Thus the selectivity is responsible for the total yield of the process, taking into account the recycling of the unconverted reactant. In the case of oxidation of toluene to benzoic aldehyde there could not be expected, up to now, more than a low conversion rate per run if the selectivity was to be maintained at an acceptable level, which level was, nevertheless, relatively low.

In practice when it was desired to carry out oxidation of toluene to benzaldehyde under the less unfavourable economical conditions it was necessary, up to now, to accept a total yield of from 30 to 50% by weight, which, in view of the high molecular weight of benzoic aldehyde as compared to toluene corresponds to an actual selectivity expressed in proportion of toluene usefully converted, of from 26 to 43%. If such a low selectivity was accepted, a conversion rate per run of from 10 to 20% might be obtained.

Due to the use of the catalyst as prepared by the process according to this invention, actual selectivities of at least 75% or even higher can be obtained even with a conversion rate of the order of 20%, when the operating conditions are conveniently selected.

The preparation of the catalyst according to the present invention is as follows:

There are admixed at least one uranium compound with at least one molybdenum compound in the presence of a strong mineral acid and the resulting product is thereafter dried and calcinated. By strong mineral acid there is meant an acid whose dissociation constant is higher than $10^{-2}$, such as for instance hydrochloric acid or phosphoric acid but preferably sulfuric acid. The use of sulfuric acid in the manufacture of the catalyst is a major feature of inventiveness in the present invention. As a matter of fact, the addition of sulfuric acid, on one hand, avoids the deactivation of the catalyst and, on the other hand, provides, during the step of toluene oxidation, a very significantly higher yield and higher selectivity than those obtained with the use of a catalyst prepared in the absence of sulfuric acid.

The compounds of the two above-mentioned metals: uranium and molybdenum, will be for instance oxides such as $UO_3$, $UO_2$, $U_3O_8$ and $MoO_3$ or salts of these metals such as uranyl salts (sulfate and nitrate), uranates (of ammonium or potassium), molybdates or paramolybdates of ammonium, sodium or potassium. There will be used from 5 to 40% (and preferably from 15 to 30%) by weight of acid as compared to the two metal compounds, calculated in the form of $UO_3+MoO_3$, these values being however not critical. It must be understood that the entirety of the acid does not remain into the catalyst. The strong acid is used for the preparation of the oxidation catalyst but it may partly or even in totality, be volatilized during the manufacture of this catalyst.

A preferred way of preparation consists of adding, to the mixture of molybdenum and uranium compounds with sulfuric acid, an alkaline or alkaline-earth metal compound such as for instance a salt of lithium, sodium, potassium, rubidium, magnesium, calcium, strontium or barium (or more generally a compound of an element selected from the Groups Ia and IIa of the periodic classification of elements).

The above-described components can also be admixed with additional metals such as chromium, tungsten, silver, copper, yttrium, cerium as well as other elements pertaining to the group of the rare earths, said various metals or elements being in the form of any compound.

The assembly (molybdenum compound+uranium compound+optionally the alkaline or alkaline-earth compound and/or the additional element) constitutes the active part of the catalyst. This latter, after mixture and calcination, in the presence of sulfuric acid, at a temperature comprised, for instance, between 400 and 800° C., will contain from 4 to 70% of molybdenum oxide expressed as $MoO_3$, from 20 to 95% of uranium oxide, expressed as $UO_3$, optionally from 0.1 to 5% and preferably between 0.5 and 1% of alkaline or alkaline-earth metal expressed in the corresponding oxide and/or from 0.01 to 20% of additional metal as hereabove defined. These parts are given by weight.

The uranium may be either natural uranium or an isotope or any mixture thereof.

The active part of the catalyst can be used as such without carrier. In this case, the most advantageous method of preparation consists, after a preliminary treatment with sulfuric acid, of dissolving the metal oxides or their salts into a solution containing citric acid and, optionally, ammonia.

The resulting limpid solution is evaporated, preferably under vacuum, and calcinated. The active part is optionally extruded with a binding agent either pure or admixed with a good heat-conducting substance, such as silicium carbide.

The active part of the catalyst may also be obtained by a malaxating of the reactants used for its preparation, followed with a calcination.

It is still possible to deposit the active part of the catalyst on a carrier. This one may be any of the currently-used carriers in the manufacture of catalysts such as alumina, silica, magnesia, zirconia or silicium carbide. The preferred carrier is however silicium carbide. In this case the impregnation is advantageously carried out with either the limpid solution used for the preparation of the active part, as above mentioned, or a solution obtained from a molybdenum-containing salt, for instance ammonium para-molybdate acidified with sulfuric acid, wherein is dissolved a uranium salt, for example uranyl nitrate and an alkaline salt.

In any case, the catalyst is calcinated at a temperature of between 400 and 800° C., preferably of about 600° C.

The oxidation of the toluene is carried out by causing a mixture of vaporized toluene with a gas containing molecular oxygen, to pass over a catalyst, at a pressure comprised, for instance, between 0.1 and 30 kg./cm.$^2$ but, preferably, at a pressure of about the atmospheric pressure, at a temperature comprised between 400 and 700° C. but, preferably, of about 600° C.

The gas accompanying the oxygen can be nitrogen, carbonic anhydride or any inert gas, even steam. The proportions of inert gas and oxygen are not critical: they are selected mainly with consideration of the risk of explosion of their mixture with toluene vapor. It may be of advantage to use air instead of any other mixture of nitrogen with oxygen.

The respective proportions of toluene and oxygen are important for a good development of the oxidation. The ratio by volume of toluene vapor to oxygen can be comprised between 0.1 and 2 but is advantageously chosen close to ½.

The following examples which are not intended to limit this invention in any way, are only illustrative of some embodiments thereof. Example 1A is given by way of comparison only.

EXAMPLE 1

A catalyst is prepared as follows:

To a mixture of 2,500 ml. of water with 2,500 ml. of concentrated ammonia (density of 0.920–0.923) are added 499.4 g. of uranium oxide UO$_3$, 48.4 g. of molybdenum oxide MoO$_3$, 164.8 g. of sulfuric acid of a density of 1.83 (i.e., 90 ml.), 5.5 g. of potassium nitrate and 840.5 g. of citric acid. The mixture, after stirring, is brought to boiling for 4 hours. There is obtained a limpid solution which is evaporated in an evaporator of the Büchi type until obtainment of a sirupy consistency. The resulting product is thereafter placed into an oven, under vacuum at 80° C. for 12 hours and then calcinated in the presence of air at 600° C. for 4 hours.

300 g. of the resulting product are roughly crushed and there is added thereto a binding agent consisting of 45 g. of gum from Senegal in admixture with 50 g. of water. The whole is mixed up to the obtainment of a homogeneous paste of very hard consistency. This paste is passed through an extruding-machine of the rasp type with extrusion holes of 3 mm. of diameter. The extruded product is dried for 1 hour at 120° C. and then calcinated for 4 hours at 600° C.

Into a reactor for catalysis there is charged a mechanically formed mixture of 25 ml. of the extruded product (i.e., 24.5 g.) with 25 ml. of silica grains of a diameter comprised between 1.7 and 2.7 mm.; the catalytic bed so extends on a height of 20 cm.

The reactor is heated to 600° C. and there is caused to pass, over the catalyst, a mixture of nitrogen with oxygen and toluene at a rate of 18.3 liters per hour, measured at 20° C., of nitrogen, of 6.1 liters per hour of oxygen and of 14.5 ml. per hour of liquid toluene. The time of contact of the gaseous mixture with the catalyst, as determined by calculation, is of about 2 seconds.

The experiment is continued for 5 hours. After this time, the total balance of the reactants and the reaction products has been established. It has been found that 27.6% of the charged toluene were converted: this is the conversion rate. The yield, per run, in benzoic aldehyde, calculated in mole per mole of charged toluene, is of 21%, which means that 76% of the converted moles of toluene have resulted in the formation of benzoic aldehyde. The selectivity as above-defined is therefore of 76%. This means that, by weight, 1 kg. of converted toluene results in the formation of 875 g. of benzoic aldehyde.

The experiment has been reproduced during 6 consecutive days over the same catalyst charge and the yield per run and the selectivity observed were the same or even higher.

It is clear therefore that the catalyst provides for very good conversions per run and selectivities. Moreover, it is very stable over a long time.

EXAMPLE 1A

In order to show the benefit of using sulfuric acid for the preparation of the catalyst according to this invention, a preparation identical to that the catalyst according to Example 1, but without sulfuric acid, has been effected (2,500 ml. of water, 2,500 ml. of ammonia, 499.4 g. of uranium oxide UO$_3$, 48.4 g. of molybdenum oxide MoO$_3$, 5.5 g. of potassium nitrate and 840.5 g. of citric acid).

This catalyst has been used under the same conditions as according to Example 1. The yield per run in benzoic acid attains 24% but the selectivity is very low, of only 49%. Moreover the catalyst becomes quickly deactivated.

It appears therefore that the addition of sulfuric acid has a very favorable effect on selectivity.

EXAMPLE 2

A catalyst has been prepared in the following manner. To 2,500 ml. of water were added 499.4 g. of uranium oxide UO$_3$, 48.4 g. of molybdenum oxide MoO$_3$, 90 ml. of sulfuric acid of a density of 1.83 and 840.5 g. of citric acid. The further steps of the manufacture are identical to those mentioned for the catalyst according to Example 1, except the catalyst has been used as such and not in extruded form. Used in the conditions of Example 1 this catalyst provides for a yield of 25% and a selectivity of 67% in benzoic aldehyde.

EXAMPLE 3

A catalyst has been prepared as according to Example 1, except that potassium nitrate is replaced by 4.6 g. of sodium carbonate, the respective amounts of the other reactants being not modified as compared to those of Example 1. Used as the catalyst of Example 1, the present catalyst provides, at 580° C., for a yield in benzoic aldehyde of 20% with a molar selectivity of 74%.

EXAMPLE 4

By replacing, in Example 3, the 4.6 g. of sodium carbonate, by 3.7 g. of rubidium carbonate, there is obtained, at 580° C., a yield of 13% with a selectivity of 85%.

EXAMPLE 5

A catalyst has been prepared as that of Example 2 by adding to the acidified mixture of uranium and molybdenum oxides, 11 g. of potassium nitrate and 21.5 g. of cupric nitrate. The yield in benzoic aldehyde, under the conditions of Example 2 is of 15% and the molar selectivity of 75%.

EXAMPLE 6

A catalyst has been prepared as according to Example 2 by adding to the acidified mixture of uranium and molybdenum oxides 5.5 g. of potassium nitrate and 21.5 g. of cerium nitrate $Ce(NO_3)_3 \cdot 6H_2O$. The yield in benzoic aldehyde, under the conditions of Example 2, is of 10% and the selectivity of 91%.

EXAMPLE 7

A catalyst has been prepared as according to Example 2, by adding to the acidified mixture of uranium and molybdenum oxides, 5.5 g. of potassium nitrate and 72 g. of tungstic acid. The yield in benzoic aldehyde, under the conditions of Example 2, is of 5% with a selectivity higher than 90%.

EXAMPLE 8

876 g. of uranyl nitrate $UO_2(NO_3)_2 \cdot 6H_2O$, 59.2 g. of ammonium paramolybdate $(NH_4)_6Mo_7O_{24} \cdot 4H_2O$ and 5.5 g. of potassium nitrate $KNO_3$ are admixed and malaxated with 90 ml. of sulfuric acid of a density of 1.83. There is thus obtained a yellow paste which is subjected to calcination at 600° C. for 4 hours. The resulting mass is then bound, extruded and calcinated according to Example 1. This catalyst provides for a yield of 24% of benzoic aldehyde with a selectivity of 75%.

EXAMPLE 9

Silicium carbide in the form of balls of a 6.4 mm. diameter, preliminarily dried, are impregnated with the limpid solution whose preparation is mentioned in Example 1. After drying in oven under vacuum, at a temperature progressively increased from 80 to 150° C. in 24 hours, and after calcination for 4 hours at 600° C., there is obtained a catalyst containing 6.1% of active substance on silicium carbide as carrier.

Over 50 ml. of such a catalyst, is caused to pass, at 570° C., a mixture of 9.15 liters per hour of nitrogen, of 3.05 liters per hour of oxygen and of 7.25 ml. per hour of toluene. The yield in benzoic aldehyde is of 10.2% and the selectivity of 87%.

EXAMPLE 10

There is prepared an aqueous solution containing 176.5 g. of ammonium paramolybdate per liter. To 33.6 ml. of said solution are added 9 ml. of sulfuric acid of a density of 1.83. There is so obtained a limpid solution in which are dissolved 87.6 g. of uranyl nitrate $UO_2(NO_3)_2 \cdot 6H_2O$ and 0.55 g. of potassium nitrate after addition of 20 ml. of water. There is obtained a limpid solution which is used to impregnate silicium carbide in grains of from 2 to 4 mm. After drying for 12 hours at 120° C. and calcination for 4 hours at 600° C., there is obtained a catalyst having a 13% by weight content of active substance deposited on silicium carbide.

Over 50 ml. of this catalyst, there is caused to pass, at 600° C., a mixture of nitrogen, oxygen and toluene in the same proportions as in Example 1. There is so obtained a yield of 16% in benzoic aldehyde and a selectivity of 78%.

What is claimed is:

1. A process for manufacturing a catalyst composition which comprises the successive steps of (a) admixing an uranium compound, selected from the group consisting of an uranium salt and an uranium oxide, with a molybdenum compound, selected from the group consisting of a molybdenum salt and a molybdenum oxide, and with a mineral acid having a dissociation constant greater than $10^{-2}$, said compounds being used in amounts corresponding to 4–70% by weight of molybdenum expressed as $MoO_3$ and 20–95% of uranium expressed as $UO_3$, with respect to the catalyst, and said mineral acid amounting to 5–40% by weight with respect to the total weight of $UO_3$ and $MoO_3$, (b) drying the resulting mixture and (c) calcining the same.

2. The process of claim 1, wherein the amount of mineral acid is 15 to 30% by weight with respect to the total weight of $UO_3$ and $MoO_3$.

3. The process of claim 1, comprising the further step of adding an aqueous solution of citric acid to the mixture resulting from the step (a), said further step being intermediate to said steps (a) and (b).

4. The process of claim 1, wherein the mineral acid is selected from the group consisting of hydrochloric acid, phosphoric acid and sulfuric acid.

5. The process of claim 1, wherein the mineral acid is sulfuric acid.

6. The process of claim 1, wherein a compound of at least one element selected from Groups Ia and IIa of the periodic table is added to the mixture.

7. The process of claim 6, wherein the compound is selected from the group consisting of a salt of lithium, sodium, potassium, rubidium, magnesium, calcium, strontium and barium.

8. The process of claim 7, wherein at least one additional compound of a metal selected from the group consisting of chromium, tungsten, silver, copper, yttrium, cerium and the rare earths is added to the mixture.

9. The process of claim 1, wherein the calcination is conducted at a temperature of about 400 to 800° C.

10. The process of claim 1, wherein after calcination the mixture contains about 4 to 70% by weight molybdenum oxide and about 20 to 95% by weight uranium oxide.

11. The process of claim 1, wherein after calcination the mixture contains about 4 to 70% by weight molybdenum oxide, about 20 to 95% by weight uranium oxide, about 0.5 to 1% by weight of a Group Ia or IIa metal oxide and about 0.01 to 20% by weight of at least one additional compound selected from the group consisting of chromium, tungsten, silver, copper, yttrium, cerium and the rare earths.

12. The process of claim 1, wherein after calcination, the catalyst is extruded and calcined.

13. The process of claim 1, wherein the catalyst is deposited on a carrier and calcined.

14. The process for oxidizing tolune to benzaldehyde which comprises passing a mixture of toluene vapors and molecular oxygen over a catalyst at a temperature of about 400 to 700° C. and a pressure of about 0.1 to 30 kg./cm.$^2$, said catalyst comprising a composition produced by the successive steps of (a) admixing a uranium compound, selected from the group consisting of a uranium salt and a uranium oxide, with a molybdenum compound, selected from the group consisting of a molybdenum salt and a molybdenum oxide, and with a mineral acid having a dissociation constant greater than $10^{-2}$ said compounds being used in amounts corresponding to 4–70% by weight of molybdenum expressed as $MoO_3$ and 20–95% uranium expressed as $UO_3$, with respect to the catalyst, and said mineral acid amounting to 5–40% by weight with respect to the total weight of $UO_3$ and $MoO_3$, (b) drying the resulting mixture and (c) calcining the same.

15. The process of claim 14, wherein the mineral acid is sulfuric acid.

16. The process of claim 14, wherein the catalyst mixture further contains at least one element selected from Groups Ia and IIa of the periodic table.

17. The process of claim 16, wherein the catalyst mixture further contains a compound selected from the group consisting of chromium, tungsten, silver, copper, yttrium, cerium and the rare earths.

18. The product produced by the process of claim 1.

19. The product produced by the process of claim 6.

(References on following page)

References Cited

UNITED STATES PATENTS

| | | | |
|---|---|---|---|
| 3,380,931 | 4/1968 | Ryland | 252—432 |
| 1,909,354 | 5/1933 | Jaeger | 260—599 |
| 1,636,854 | 7/1927 | Craver | 260—599 |
| 3,387,038 | 6/1968 | Koch | 260—604 |

DANIEL E. WYMAN, Primary Examiner

P. M. FRENCH, Assistant Examiner

U.S. Cl. X.R.

252—435, 437, 439, 440, 441, 462, 467, 468